No. 741,029. Patented October 13, 1903.

UNITED STATES PATENT OFFICE.

RICHARD GLEY AND OTTO SIEBERT, OF BERLIN, GERMANY, ASSIGNORS TO ACTIEN-GESELLSCHAFT FÜR ANILIN FABRIKATION, OF BERLIN, GERMANY.

RED AZO LAKE.

SPECIFICATION forming part of Letters Patent No. 741,029, dated October 13, 1903.

Application filed March 26, 1903. Serial No. 149,735. (No specimens.)

*To all whom it may concern:*

Be it known that we, RICHARD GLEY and OTTO SIEBERT, of Berlin, in the Kingdom of Prussia, German Empire, have invented new and useful Improvements in the Production of Red Azo Dye Lakes; and we do hereby declare that the following is a full, clear, and exact description thereof, which will enable others skilled in the art to which it appertains to make and use the same.

We have found that the monazo dyestuff which is obtained by combining the diazo compound of the amido-sulfo acid of the following formula:

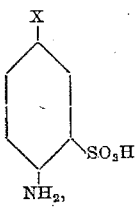

in which X represents $NO_2$, $CH_3$, or Cl, with beta-oxy-naphthoic acid is most suited for the production of red lakes by preparing the calcium, barium, aluminium, zinc, or other metal salts and mixing them with a suitable substratum. The lakes thus prepared are of great value for use in the manufacture of lithographic printings and similar purposes especially on account of their brilliant red color and their fastness to water, oil, and light.

We describe the manner in which we carry out our invention in the following examples without limiting ourselves to the proportions or materials given therein:

*Example I—Barium lake.*—Mix a paste of thirteen parts of the sodium salt of the dyestuff para-toluidin sulfo-acid azo beta-oxynaphthoic acid, containing twenty-five per cent. of the dyestuff, with one hundred parts of water and add to this a solution of 1.3 parts of crystallized barium chlorid in twenty-five parts of water and boil for some time. Hereafter mix with the precipitate thus obtained eighty parts of a paste of alumina hydrate of five per cent., filter, wash, and dry. After having well pulverized the lake it is ready for use.

*Example II—Calcium lake.*—Mix well fourteen parts of a paste of the dyestuff para-nitranilin sulfo-acid azo beta-oxynaphthoic acid (twenty-five per cent.) with one hundred and twenty parts of water. Add to this an aqueous solution of 5.6 parts of calcium chlorid, boil for a short time, and add a paste of five parts of freshly-precipitated gypsum, filter, wash, dry, and pulverize.

In the foregoing examples instead of the sodium salts of the dyestuff also other alkaline salts or their free acids may be employed. The effect is also not essentially changed if other metal salts and other substrata are used.

Having thus described our invention and in what manner the same is to be performed, what we claim is—

The new red-color lake prepared by converting into an insoluble metal salt substantially as described, the azo dyestuff obtained by combining the para-substituted diazo compound of the amido-benzone-ortho-sulfonic acid with beta, beta$_2$oxynaphthoic acid, said lake being distinguished by its brilliant red color and its fastness to light, water and oil, substantially as described.

In witness whereof we have hereunto signed our names, this 10th day of March, 1903, in the presence of two subscribing witnesses.

RICHARD GLEY.
OTTO SIEBERT.

Witnesses:
WOLDEMAR HAUPT,
HENRY HASPER.